United States Patent [19]

Kato et al.

[11] Patent Number: 5,145,738
[45] Date of Patent: Sep. 8, 1992

[54] MAGNETIC RECORDING MEDIUM

[75] Inventors: Mikihiko Kato; Yasushi Endo; Toshio Kawamata; Yasuo Nishikawa, all of Kanagawa, Japan

[73] Assignee: Fuji Photo Film Co., Ltd., Kanagawa, Japan

[21] Appl. No.: 331,205

[22] Filed: Mar. 31, 1989

[30] Foreign Application Priority Data

Apr. 1, 1988 [JP] Japan ................... 63-80278

[51] Int. Cl.$^5$ ............................................. G11B 23/00
[52] U.S. Cl. ..................................... 428/336; 428/408; 428/694; 428/695; 428/900
[58] Field of Search ............... 428/408, 336, 694, 695, 428/900

[56] References Cited

U.S. PATENT DOCUMENTS

| 4,303,738 | 12/1981 | Gini et al. | 428/695 |
| 4,546,038 | 10/1985 | Yanaguchi et al. | 428/695 |
| 4,741,959 | 5/1988 | Abe et al. | 428/900 |
| 4,772,522 | 9/1988 | Kubota et al. | 428/695 |
| 4,786,551 | 11/1988 | Ootani et al. | 428/695 |

Primary Examiner—Paul J. Thibodeau
Assistant Examiner—Leszek Kiliman
Attorney, Agent, or Firm—Sughrue, Mion, Zinn, Macpeak & Seas

[57] ABSTRACT

A magnetic recording medium comprising a non-magnetic support having thereon a magnetic layer comprising ferromagnetic metal powder and a binder, the magnetic layer further comprising carbon black having an average particle diameter of 250 m$\mu$ or more in an amount of from 1 to 10 parts by weight per 100 parts by weight of the ferromagnetic metal powder, and an ester of tridecyl alcohol with stearic acid and/or an ester of tridecyl alcohol with palmitic acid in an amount of from 5 to 20 parts by weight per 100 parts by weight of the ferromagnetic metal powder.

7 Claims, No Drawings

MAGNETIC RECORDING MEDIUM

BACKGROUND OF THE INVENTION

This invention relates to a magnetic recording medium, and in particular relates to an improvement in the running durability of magnetic recording media using ferromagnetic metal powder.

In recent years, there has been increased demand for magnetic recording media suitable for high density recording. In this regard, magnetic recording media comprising ferromagnetic metal powder and a binder (hereafter, metal powder type magnetic recording media) are superior in magnetic properties such as coercive force (Hc) and saturation magnetization (Bm), and may be expected to serve as magnetic recording media suitable for high density recording. Indeed, they are already being presented for practical use in 8 mm video tapes and video floppy disks magnetic recording media.

However, the metal powder magnetic recording media require smooth magnetic layer surfaces in order to handle high density recording, so there is a tendency toward an increase in the coefficient of friction for the contact between the apparatus system and the magnetic layer of the running magnetic recording medium, stick slips occur, output becomes unstable because of head vibration, head sticking occurs, and running durability of the tape deteriorates.

Various attempts have been made to improve upon such problems and to raise the running durability of the metal powder type magnetic recording media.

For example, there are methods of adding lubricants in the magnetic layer, such as the method of adding polyethylene glycol ester (JP-A-57-3225), the method of adding ketone compounds (JP-A-57-15802), the method of adding a fatty acid glycerol ester and a fatty acid sorbitan ester (JP-A-57-158027), the method of adding a fatty acid and a fatty acid ester (JP-A-58-130435, JP-A60-5420 and U.S. Pat. No. 4,465,737), and the method of adding a fatty acid alkyl ester and fatty acid alkoxy ester (JP-A-61-229234, JP-A-61-230624 and U.S. Pat. No. 4,652,500) (The term "JP-A" used herein means an unexamined published Japanese patent application). However, with these method, it is difficult to regulate or select the amount of the lubricant which should be added, because when the lubricant is added in an amount where the lubrication effect appears, the film quality of the magnetic layer becomes weak, its durability deteriorates, and sticking occurs at the head.

Also, as a different method, there is the method of adding abrasives in the magnetic layer. For example, there may be mentioned the method of adding α-ferric oxide (JP-A-58-159227), the method of addung $Al_2O_3$ (JP-A-58-171721), and the method of adding particles under 0.2 μm in size and over 6 in Mohs' hardness (JP-A-61-289528 and U.S. Pat. No. 4,687,703). However, when the abrasive is added in an amount sufficient to raise the running durability, other problems appear. Such problems include, for example, the fact that the magnetic head wears out, the surface qualities of the magnetic layer worsen, and electromagnetic conversion properties deteriorate.

Still another method that has been proposed is exemplified by the method of combined use of an abrasive and a fatty acid ester (JP-A-58-189826), and the method of combined use of carbon black and a silicone oil (JP-A-62-195730).

However, with every one of these method, there has been an accompanying decline in other properties, and they have not been sufficient to the point where they are capable of improving upon the running durability of metal powder type magnetic recording media to any degree. Particularly in cases when the attachment and detachment of the head to the magnetic layer surface is repeated many times, as with floppy disks, the coefficient of friction of the magnetic layer increases during travelling so that the output is made unstable by head vibration due to stick-slip of the medium, sticking on the head leads to poor running, and it has been very difficult to solve these problems by the conventional method.

SUMMARY OF THE INVENTION

An object of the present invention is to offer a metal powder type magnetic recording medium with improved running durability by decreasing the coefficient of friction without damage to other properties, in order to overcome the problems present in the prior art mentioned above.

The above and other objects and effects of the present invention will be apparent from the following description.

The objects of the present invention are achieved by a magnetic recording medium comprising a non-magnetic support having thereon a magnetic layer comprising ferromagnetic metal powder and a binder, the magnetic layer further comprising carbon black having an average particle diameter of 250 mμ or more and an ester of tridecyl alcohol with stearic acid and/or palmitic acid.

DETAILED DESCRIPTION OF THE INVENTION

In the present invention, the average particle diameter of the carbon black contained in the magnetic layer is 250 mμ or more as measured by an electron microscope, and preferably does not exceed 350 mμ. When the average particle diameter is less than 250 mμ, the coefficient of friction cannot be decreased effectively, and when it becomes too large, the head attachment to the magnetic layer worsens and the output declines. The amount of the carbon black is preferably from 1 to 10 parts by weight per 100 parts by weight of the ferromagnetic metal powder, and more preferably 3 to 7 parts by weight. When the amount is too small, there is little effect in decreasing the coefficient of friction, and when it is too large, the head attachment to the magnetic layer worsens, and because the degree of filling of the ferromagnetic metal powder declines, output ends up declining.

The carbon black used in the present invention can be from any method of manufacture. For example, carbon black such as furnace black, thermal black, acetylene black and channel black can be used.

In the present invention, the ester contained in the magnetic layer may be an ester of tridecyl alcohol and stearic acid or an ester of tridecyl alcohol and palmitic acid, either used alone or as a mixture of both esters. Further, the starting tridecyl alcohol may ordinarily be obtained by synthesis with the oxo synthesis process, and since products thus obtained are mixtures of many types of isomers, the ester obtained therefrom may be a mixture of isomers.

When using mixtures of the ester of tridecyl alcohol and stearic acid and the ester of tridecyl alcohol and palmitic acid, the amount of the ester of stearic acid is preferably from 80 to 20 mol %, and preferably 60 to 40 mol %, based on the total molar amount of the esters.

The amount of the ester contained in the magnetic layer is preferably from 5 to 20 parts by weight, more preferably from 6 to 15 parts by weight, and most preferably from 9 to 12 parts by weight, per 100 parts by weight of the ferromagnetic metal powder. When the amount is too little, sufficient durability cannot be guaranteed, and when it is too great, it will be undesirable because of an increased coefficient of friction.

Tridecyl alcohol used in this invention preferably has a branched structure, and accordingly the esters preferably have a low melting point and will be in a liquid state at ordinary temperatures, in spite of their molecular weight. Also, the esters have the property of being difficult to evaporate because of their large molecular weight. Consequently, the esters act as a liquid lubricant on the magnetic layer surface, and are difficult to evaporate from the magnetic layer under high temperatures, and as a consequence, have the characteristic of maintaining the running durability of the magnetic recording medium within a wide temperature range.

In the present invention, the above stated characteristics of the ester will be made to work much more effectively because the carbon black is present in the magnetic layer along with the ester, and by this it will be understood that the running durability of the metal powder type magnetic recording medium will be greatly improved. The present invention will be particularly effective in floppy disks, etc., which undergo repeated travel under environmental conditions of fluctuations in temperature and humidity. When the ester is present alone by itself, the surface of the magnetic layer is scraped during long periods of repeated running, and sticking tends to occur on the head.

While not wishing to be found to any theory as to how or why the present invention achieves its results, it is believed that the carbon black in the magnetic layer adsorbs and retains the ester on the surface of the magnetic layer in a constantly suitable quantity, and as a result, the ester is constantly supplied in a suitable amount on the surface of the magnetic layer, regardless of variations in the environmental conditions of use of the metal powder type magnetic recording medium. Also, the fact that the amount of the ester in the binder is small, so that the degree of plasticization of the binder is correspondingly abated, may be considered as having an effect in raising the running durability.

Further, in following the present invention, it is possible to stabilize the running durability even more by means of the combined use of carbon black having an average particle diameter of 250 m$\mu$ or more with carbon black with small average particle diameters. That is, when the combined use is made of carbon black of from 15 to 150 m$\mu$ and carbon black of 250 m$\mu$ or more, even if the amount of the carbon black with an average diameter of 250 m$\mu$ or more is small, there will still be improvement in the durability of the magnetic layer, together with a reduction in the coefficient of friction. The amount of the carbon black having an average particle diameter of from 15 to 150 m$\mu$ is preferably from 1 to 10 parts by weight per 100 parts by weight of the ferromagnetic metal powder, and is preferably from 3 to 7 wt % based on the amount of the carbon black having an average particle diameter of 250 m$\mu$ or more.

The ferromagnetic metal powder which can be used in the present invention must at least contain Fe, and specifically may be a metal or alloy of which the main ingredient is, for example, Fe, Fe-Co, Fe-Ni or Fe-Co-Ni. In order to improve the properties, nonmetals such as B, C, Al, Si and P can also be added In order to stabilize the particles of the ferromagnetic powder, a layer of an oxide is generally formed on the surface. It is preferred that the metal powder has a specific surface area of 40 m$^2$/g or more (as determined by the BET method) and a crystal size of 400 Å or less. Also, the axial ratio is preferably 5 or more, the saturation magnetization is preferably 110 emu/g or more, and the coercive force is preferably 800 Oe or more.

The binder which can be used in the present invention may be prior known thermoplastic resins, thermosetting resins and reactive resins, and their mixtures, for example, vinyl chloride-vinyl acetate copolymers, other vinyl chloride copolymers, acrylate ester copolymers, methacrylate ester copolymers, urethane elastomers, cellulose derivatives and epoxy-polyamide resins. Also, various types of polyisocyanates can be used as hardeners. The amount of the binder is preferably from 5 to 300 parts by weight per 100 parts by weight of the ferromagnetic metal powder. Also, in order to increase dispersibility, it is preferred to introduce in the binder molecules suitable amounts of functional groups such as carboxy groups, sulfonate groups, hydroxide groups, amino groups and epoxy groups.

The nonmagnetic support used in the present invention can be exemplified by various synthetic resin films such as polyethylene terephthalate, polycarbonate, polyamide, and polyimide, and by metal foils such as aluminum foil and stainless steel foil.

The magnetic recording medium of the present invention can be prepared by conventional techniques. For example, an organic solvent can be added to the carbon black and the ester together with the ferromagnetic metal powder and the binder, and the resulting mixture can be kneaded to effect dispersion and form a magnetic coating composition. The coating composition can then be coated on the nonmagnetic support, and orientation, drying and surface smoothing treatment can be performed to make the metal powder type magnetic recording medium. Also as required, a backing layer may be coated on the surface opposite the magnetic layer.

The organic solvent may be various types such as methyl ethyl ketone, cyclohexanone, isobutyl alcohol, butyl acetate and toluene, used singly or in mixtures.

Also, in regard to the kneading for dispersion, the ingredients of the coating composition may be given kneading and dispersion treatment by charging them into a kneader simultaneously, or individually and gradually.

The thickness of the magnetic layer of the present invention is generally from 0.5 to 12 $\mu$m.

Otherwise, addition may be made at any time of such materials as abrasives, lubricants other than the esters, dispersing agents and antistatic agents, for the purpose of improving the properties of the metal powder type magnetic recording medium.

The abrasives that may be used are high hardness powders such as alumina, chromium oxide and silicon carbide.

Various kinds of fatty acids, silicone oil and esters can be used as lubricants, besides the esters described above.

The present invention will be further specifically explained below, by means of examples and comparative examples but the present invention is not construed as being limited thereto. Further, "parts" always mean "parts by weight" in the following examples and comparative examples.

EXAMPLE 1

| | |
|---|---|
| Ferromagnetic metal powder (Fe 99%, Ni 1%, Specific surface area: 51 m$^2$/g, Coercive force (Hc): 1,580 Oe, Saturation magnetization ($\sigma_s$): 125 emu/g) | 300 parts |
| Vinyl chloride-vinyl acetate-maleic anhydride copolymer (Made by Nippon Zeon Co., Ltd., 400X110A) | 300 parts |
| Soybean oil lecithin | 1.2 parts |
| Chromium oxide (Cr$_2$O$_3$, Average particle diameter: 0.5 m$\mu$) | 30 parts |
| Carbon black (Made by CAN CARB Company, Thermo Black MT, Average particle diameter: 280 m$\mu$) | 9 parts |
| Toluene | 36 parts |
| Methyl ethyl ketone | 36 parts |

After kneading the above composition for about one hour in a kneader, the following additional ingredients were added.

| | |
|---|---|
| Polyester polyurethane (Made by Toyobo Co., Ltd., UR 8300, containing sulfonate group 150 equivalent/10$^6$ g, Weight average molecular weight: 70,000) | 20 parts |
| Methyl ethyl ketone | 250 parts |
| Toluene | 250 parts |

Next, the resulting composition was kneaded and dispersed in a sand grinder for about two hours at 2,000 rpm. Further, the composition described below was added, kneading and dispersion treatment was done again in a sand grinder to obtain a magnetic coating composition of uniform dispersion.

| | |
|---|---|
| Ester of tridecyl alcohol and stearic acid (TDS) and ester of tridecyl alcohol and palmitic acid (TDP) in a 1:1 weight mixture (INOLEX B 109 made by Wilson Pharmaceutical Co. Inolex Chemical Division) | 30 parts |
| Polyisocyanate (made by Nippon Polyurethane Co., Ltd. Collonate L) | 25 parts |

The magnetic coating composition obtained as above was coated using a gravure roll onto both surfaces of a polyethylene terephthalate film 300 mm wide and 75 $\mu$m thick, of that each surface had dried film thicknesses of 3 $\mu$m, and calendering was done to obtain a metal powder type magnetic recording medium.

EXAMPLE 2

A metal powder type magnetic recording medium was obtained under conditions identical to those in Example 1, except that 9 parts of MT-Cl (average particle diameter 350 m$\mu$ made by Cebarco Co., Ltd.) were used as the carbon black instead of the Thermo Black MT used in Example 1.

EXAMPLE 3

A metal powder type magnetic recording medium was obtained under conditions identical to those in Example 1, except that 30 parts of the Thermo Black in Example 1 were used.

EXAMPLE 4

A metal powder type magnetic recording medium was obtained under conditions identical to those in Example 1, except that 3 parts of the Thermo Black in Example 1 were used.

COMPARATIVE EXAMPLE 1

A metal powder type magnetic recording medium was obtained under conditions identical to those in Example 1, except that no carbon black is used.

COMPARATIVE EXAMPLE 2

A metal powder type magnetic recording medium was obtained under conditions identical to those in Example 1, except that 9 parts of Sterling FT (average particle diameter 180 m$\mu$, made by Cabot Co., Ltd.) were used as the carbon black, instead of the Thermo Black in Example 1.

COMPARATIVE EXAMPLE 3

A metal powder type magnetic recording medium was obtained under conditions identical to those in Example 1, except that 40 parts of the Thermo Black MT in Example 1 were used.

EXAMPLE 5

A metal powder type magnetic recording medium was obtained under conditions identical to those in Example 1, except that 60 parts were used instead of 30 parts of the ester of tridecyl alcohol and stearic acid (TDS) and ester of tridecyl alcohol and palmitic acid (TDP) in a 1:1 weight mixture (INOLEX B 109).

EXAMPLE 6

A metal powder type magnetic recording medium was obtained under conditions identical to those in Example 1, except that 15 parts were used instead of the 30 parts of the ester of tridecyl alcohol and stearic acid (TDS) and ester of tridecyl alcohol and palmitic acid (TDP) in a 1:1 weight mixture (INOLEX B 109).

COMPARATIVE EXAMPLE 4

A metal powder type magnetic recording medium was obtained under conditions identical to those in Example 1, except that 30 parts of isocetyl stearate were used instead of the 30 parts of the ester of tridecyl alcohol and stearic acid (TDS) and ester of tridecyl alcohol and palmitic acid (TDP) in a 1:1 weight mixture (INOLEX B 109) used in Example 1.

COMPARATIVE EXAMPLE 5

A metal powder type magnetic recording medium was obtained under conditions identical to those in Example 1, except that 30 parts of butyl laurate were used instead of the 30 parts of the ester of tridecyl alcohol and stearic acid (TDS) and ester of tridecyl alcohol and palmitic acid TDP) in a 1:1 weight mixture (INOLEX B 109) used in Example 1.

COMPARATIVE EXAMPLE 6

A metal powder type magnetic recording medium was obtained under conditions identical to those in Example 1, except that 30 parts of isooctyl stearate were used instead of the 30 parts of the ester of tridecyl alcohol and stearic acid (TDS) and ester of tridecyl alcohol and palmitic acid (TDP) in a 1:1 weight mixture (INOLEX B 109) used in Example 1.

COMPARATIVE EXAMPLE 7

A metal powder type magnetic recording medium was obtained under conditions identical to those in Example 1, except that here were used 9 parts of the ester of tridecyl alcohol and stearic acid (TDS) and ester of tridecyl alcohol and palmitic acid (TDP) in a 1:1 weight mixture (INOLEX B 109) used in Example 1.

COMPARATIVE EXAMPLE 8

A metal powder type magnetic recording medium was obtained under conditions identical to those in Example 1, except that there were used 75 parts of the ester of tridecyl alcohol and stearic acid (TDS) and ester of tridecyl alcohol and palmitic acid (TDP) in a 1:1 mixture (INOLEX B 109) used in Example 1.

Each of the samples in Examples 1 to 6 and Comparative Examples 1 to 8, obtained as described above, were processed into 3.5 inch floppy disks.

Then each sample was mounted in a floppy disk drive (FD-1135-D, made by NEC Corporation), and thermocycle tests were carried out for 24 hours under varying environmental conditions of a temperature of 5° C. and a relative humidity 10% to a temperature of 50° C. and a relative humidity 30%.

Using the FD-1135-D head, the coefficient of friction on the head at 360 rpm was measured under an environment of 23° C. and 50%.

Also, the running durability was evaluated by the conditions when the passes travelled were 25,000,000. The electromagnetic conversion properties were evaluated by the initial 2F output, taking the Example 1 sample as 100%.

The results obtained in the manner described above are shown in Table 1.

TABLE 1

| Sample | Head Coefficient of Friction | Initial 2F Output | Running Durability (Pass Cycles) | Notes |
|---|---|---|---|---|
| Example 1 | 0.25 | 100 | 25,000,000 No abnormality | |
| Example 2 | 0.20 | 98 | 25,000,000 No abnormality | Carbon black average particle diameter 350 mµ |
| Example 3 | 0.24 | 95 | 25,000,000 No abnormality | 30 parts carbon black |
| Example 4 | 0.28 | 98 | 25,000,000 No abnormality | 3 parts carbon black |
| Comparative Example 1 | 0.37 | 95 | 20,000,000 scraping | No carbon black |
| Comparative Example 2 | 0.35 | 101 | 20,000,000 Head vibration | Carbon black average particle diameter 180 mµ |
| Comparative Example 3 | 0.20 | 87 | 25,000,000 No abnormality | 40 parts carbon black |
| Example 5 | 0.28 | 100 | 25,000,000 No abnormality | 60 parts ester |
| Example 6 | 0.24 | 100 | 25,000,000 No abnormality | 15 parts ester |
| Comparative Example 4 | 0.26 | 99 | 15,000,000 Scraping | Ester is isocetyl stearate |
| Comparative Example 5 | 0.25 | 97 | 10,000,000 Scraping | Ester is butyl laurate |
| Comparative Example 6 | 0.26 | 98 | 15,000,000 Scraping | Ester is isooctyl stearate |
| Comparative Example 7 | 0.24 | 100 | 17,500,000 Scraping | 9 parts ester |
| Comparative Example 8 | 0.32 | 101 | 10,000,000 Head sticking | 75 parts ester |

The cases where the average particle diameters of the carbon black was 280 mµ (Example 1) and 350 mµ (Example 2) showed good effect in the head coefficient of friction, output and running durability. Also, even when the amount of carbon black was varied from 30 parts (Example 3) to 3 parts (Example 4), good results were shown overall even though there was a slight decline in output with 30 parts.

When carbon black was not used (Comparative Example 1), the coefficient of friction became high, along with the appearance of scraping in the magnetic layer at 20,000,000 passes. Also, when carbon black was used having an average particle diameter of 80 mµ (Comparative Example 2), the coefficient of friction became high, and head vibration occurred at 20,000,000 passes. Further, when the carbon black content was 40 parts (Comparative Example 3), although the coefficient of abrasion did decline, the output declined markedly.

When the ester content was 60 parts (Example 5) or 15 parts (Example 6), in either case the properties were good, but at 9 parts (Comparative Example 7) and 75 parts (Comparative Example 8), there was scraping during running, and head sticking occurred.

In cases when the ester used was other than the ester of tridecyl alcohol and stearic acid (TDS) and ester of tridecyl alcohol and palmitic acid (TDP) in a 1:1 weight mixture (INOLEX B 109) (Comparative Examples 4 to 6), scraping occurred during travel.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a nonmagnetic support having thereon a magnetic layer comprising ferromagnetic metal powder and a binder, said magnetic layer further comprising carbon black having an average particle diameter of 250 mμ or more in an amount of from 1 to 10 parts by weight per 100 parts by weight of said ferromagnetic metal powder, and an ester of tridecyl alcohol with stearic acid and an ester of tridecyl alcohol with palmitic acid in an amount of from 5 to 20 parts be weight per 100 parts by weight of said ferromagnetic metal powder, and wherein the molar ratio of said ester of tridecyl alcohol with stearic acid to said ester of tridecyl alcohol with palmitic acid is from 80/20 to 20/80.

2. A magnetic recording medium as claimed in claim 1, wherein the average particle diameter of said carbon black does not exceed 350 mμ.

3. A magnetic recording medium as claimed in claim 1, wherein the amount of said carbon black is from 3 to 7 parts by weight per 100 parts by weight of said ferromagnetic metal powder.

4. A magnetic recording medium as claimed in claim 1, wherein the molar ratio of said ester of tridecyl alcohol with stearic acid to said ester of tridecyl alcohol with palmitic acid is from 60/40 to 40/60.

5. A magnetic recording medium as claimed in claim 1, wherein the total amount of said esters is from 9 to 15 parts by weight per 100 parts by weight of said ferromagnetic metal powder.

6. A magnetic recording medium as claimed in claim 1, wherein said magnetic layer further comprises carbon black having an average particle diameter of from 15 to 150 mμ.

7. A magnetic recording medium as claimed in claim 1, wherein the thickness of said magnetic layer is from 0.5 to 12 μm.

* * * * *